A. H. LOFLAND.
TRACTOR WHEEL.
APPLICATION FILED OCT. 17, 1916.

1,246,443.

Patented Nov. 13, 1917.

Witnesses

A. H. Lofland, Inventor by C. A. Snow & Co., Attorneys

UNITED STATES PATENT OFFICE.

ALFRED H. LOFLAND, OF MILTON, DELAWARE.

TRACTOR-WHEEL.

1,246,443. Specification of Letters Patent. Patented Nov. 13, 1917.

Application filed October 17, 1916. Serial No. 126,144.

*To all whom it may concern:*

Be it known that I, ALFRED H. LOFLAND, a citizen of the United States, residing at Milton, in the county of Sussex and State of Delaware, have invented a new and useful Tractor-Wheel, of which the following is a specification.

The device forming the subject matter of this application is a tractor wheel, and one object of the invention is to provide novel means whereby water may be introduced into, and contained within, a plurality of compartments within the wheel, thereby to effect a weighting of the wheel.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1:
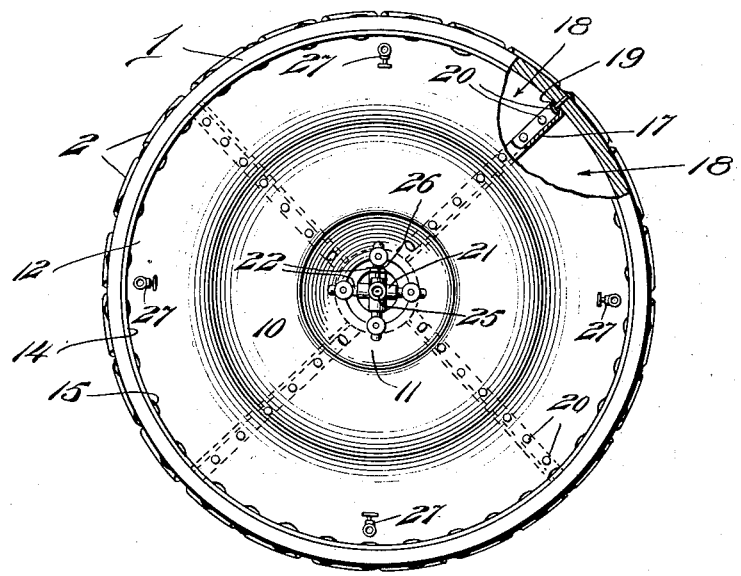
Figure 2:
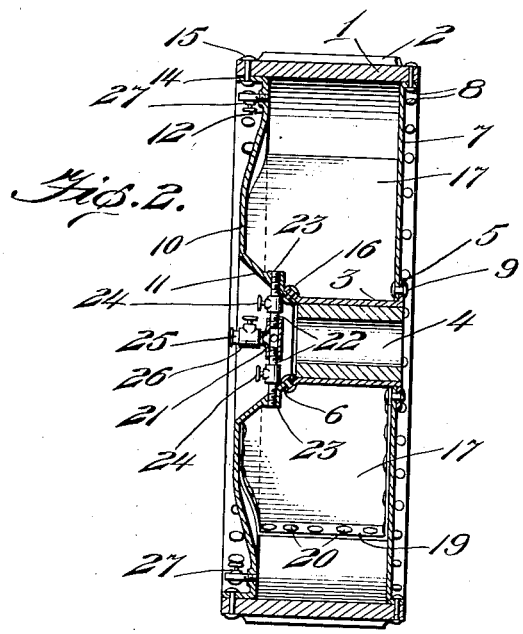

Figure 1 shows in side elevation, a tractor wheel constructed in accordance with the present invention, parts being broken away and parts appearing in section; and Fig. 2 is a transverse section of a tractor wheel shown in Fig. 1.

The tractor wheel forming the subject matter of this application preferably is made from metal throughout and includes a rim 1 provided with traction cleats 2. The numeral 3 designates the hub of the wheel, within which may be placed a tubular bearing 4. The inner end of the hub 3 is provided with a rectangularly disposed flange 5, and at the outer end of the hub 3 there is formed an outwardly slanting inclined flange 6. The numeral 7 designates a side plate attached by means of securing elements 8 to the rim 1. By means of securing elements 9, the side plates 7 is secured to the rectangular flange 5 of the hub 3. The numeral 10 denotes a side plate having a depressed conical center 11. Adjacent its periphery, the side plate 10 is extended inwardly to form a circumscribing trough 12 terminating in an outstanding flange 14 attached by securing elements 15 to the rim 1.

By means of securing elements 16, the depressed center 11 of the side plate 10 is attached to the inclined flange 6 of the hub.

Disposed within the contour of the wheel as above described are partitions 17 disposed radially and defining compartments 18. The partitions 17 are equipped with marginal flanges 19, and by means of securing elements 20, the flanges 19 are secured to the rim 1, to the side plates 7 and 10, and to the hub 3.

The numeral 21 designates a four-way coupling interposed within the contour of the depressed center 11 of the side plate 10. From the arms of the coupling 21, pipes 22 pass through the depressed center 11 of the side plate 10 and communicate with the respective compartments 18. If desired, the pipes 22 may be threaded into the nipples 23 formed in the center 11 of the side plate 10. Interposed in the pipes 22 are valves 24 which are under the control of an operator. Communicating with the center of the four-way coupling 21 is an inlet pipe 25 carrying a hand valve 26. It is to be observed that the four-way coupling 21 and parts carried thereby are housed within the contour of the depressed center 11 at the side plate 10, to avoid injury. Drain cocks 27 are mounted in the circumscribing trough portion 12 of the side plate 10, the cocks 27 being housed within the contour of the said trough 12 to avoid injury.

The valve 26 in the inlet 25 may be opened, and, if the valves 24 in the pipes 22 are open, water may be introduced into all of the compartments 18 to serve as a weight for the wheel. By closing and opening the valves 24 in the pipes 22, the amount of water placed in any compartment 18 may be regulated. The water may be drained out of some or all of the compartments 18 by opening the cocks 27. Since the wheel is interiorly provided with the partitions 17, the water in the compartments 18 does not splash, move about and disturb the equilibrium of the wheel unduly. It is possible to fill or empty any or all of the compartments 18, and the balance of the wheel may be adjusted as occasion may demand.

Having thus described the invention, what is claimed is:—

1. A traction wheel comprising a rim; a hub; side plates extended between the rim and the hub; partitions extended between the rim and the hub, and between the side plates, to define compartments; a coupling; conduits leading from the coupling to all of the compartments; a valve controlling each conduit separately; and a valve carried by the coupling and controlling all of the conduits.

2. A traction wheel comprising a rim; a hub; side plates extended between the rim and the hub; partitions extended between the rim and the hub and extended between the side plates to form separate compartments; means for introducing liquid into the compartments separately, from a point adjacent to the hub; and means for draining the compartments separately, adjacent the rim.

3. A traction wheel comprising a hub; a rim; side plates extended between the hub and the rim, one side plate being depressed adjacent the rim to form a circumscribing trough, and being depressed adjacent the hub to form a reëntrant central portion; a drain cock communicating with the interior of the wheel and located in the circumscribing trough of said side plate; and a filling means for the wheel, the filling means being assembled with said side plate, and being housed within the depressed central portion thereof.

In testimony that I claim the foregoing as my own, I have hereto affixed my signature in the presence of two witnesses.

ALFRED H. LOFLAND.

Witnesses:
  JOSEPH L. BLACK, Jr.,
  JOS. M. LANK.